April 25, 1933.      S. C. CARTER      1,905,145
TRANSMISSION
Filed Jan. 26, 1931      3 Sheets-Sheet 1
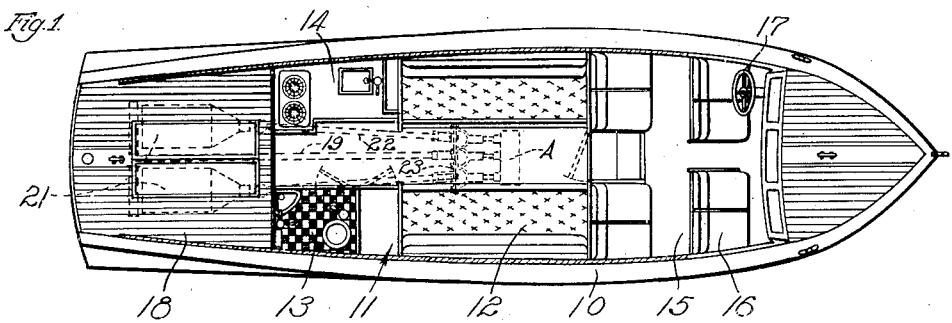
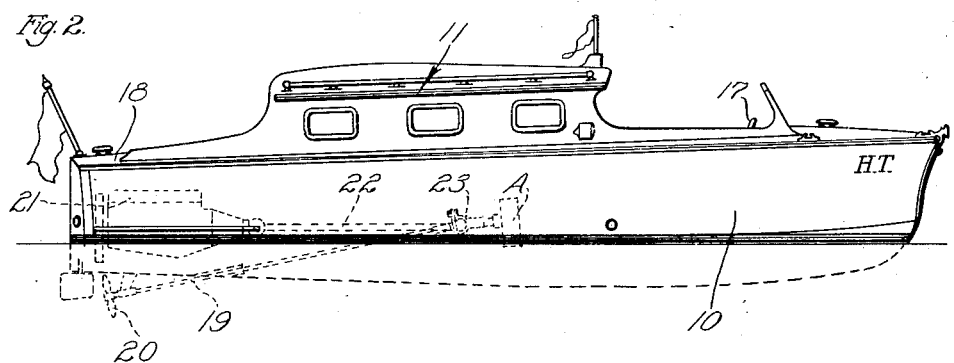
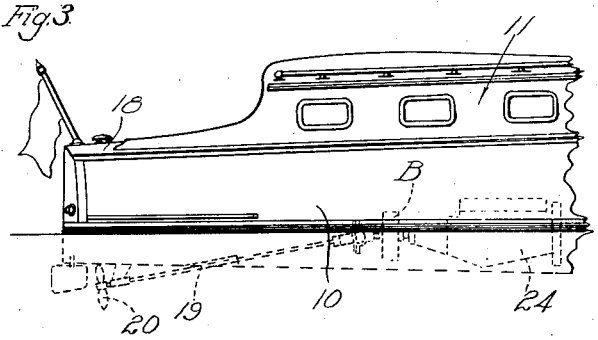
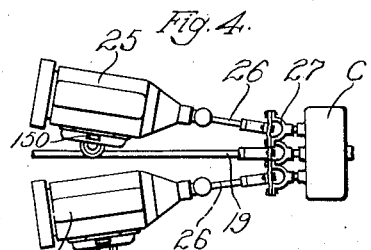
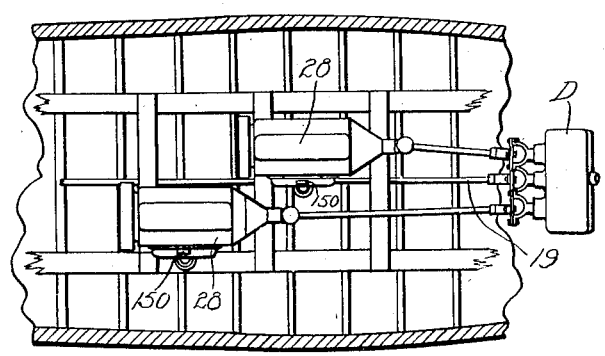
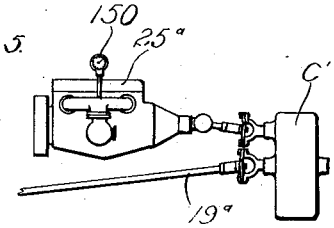
INVENTOR
SAMUEL C. CARTER
By
His ATTORNEY

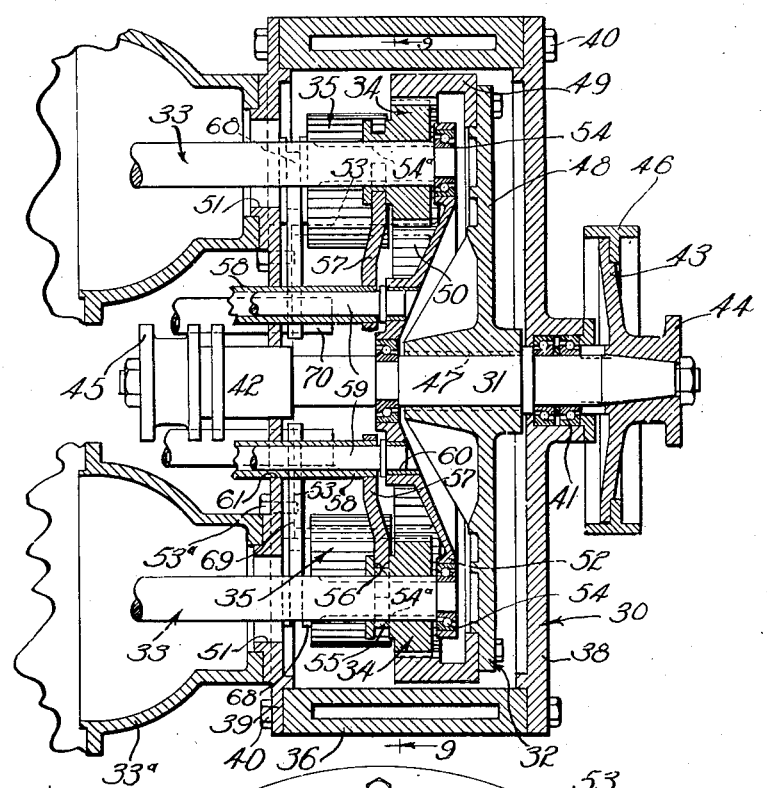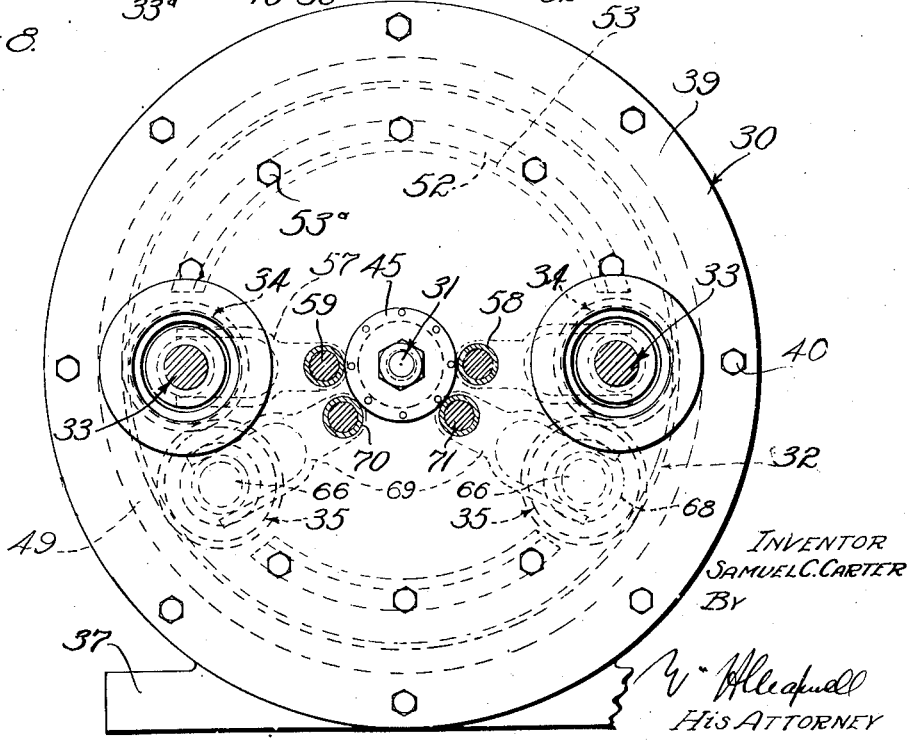

April 25, 1933.  S. C. CARTER  1,905,145

TRANSMISSION

Filed Jan. 26, 1931  3 Sheets-Sheet 3

INVENTOR
SAMUEL C. CARTER
By
His ATTORNEY

Patented Apr. 25, 1933

1,905,145

UNITED STATES PATENT OFFICE

SAMUEL C. CARTER, OF LOS ANGELES, CALIFORNIA

TRANSMISSION

Application filed January 26, 1931. Serial No. 511,293.

This invention relates to a power transmission and relates more particularly to a reversible speed reducing transmission mechanism. It is a general object of the invention to provide a simple and compact reversible speed reducing mechanism in which two or more driven or high speed shafts may be employed to drive a single driven or low speed shaft.

It is an object of the invention to provide a power transmission in which a reduction in speed and a reversible drive is obtained between two shafts by three gears.

It is another object of the invention to provide a transmission mechanism by means of which two or more shafts rotating in synchronism may be employed to drive a shaft at a reduced rate of speed and in a forward or reverse direction.

Another object of the invention is to provide a gear mechanism of the character mentioned that embodies a pinion on each drive shaft that is shiftable between a position in engagement with a single gear on the driven shaft and a position in mesh with a reversing pinion that may be brought into engagement with the single gear on the driven shaft.

It is a further object of the invention to provide a transmission of the character mentioned that is particularly useful in connection with the propulsion means of a boat or vessel where two or more power means, such as internal combustion engines, are utilized to drive a single propeller shaft.

It is another object of the invention to provide a transmission mechanism of the character mentioned that permits the use of two or more power units in a restricted space. The drive shafts from the power units may enter the transmission in spaced relation and/or at opposite ends of the transmission.

It is another object of the invention to provide a transmission mechanism of the character mentioned in which the pinions on the drive shafts may be disconnected from the driven gear independently of one another.

It is a further object of the invention to provide a reversible speed reducing transmission of the character mentioned that is particularly inexpensive to manufacture and install.

Figure 9:
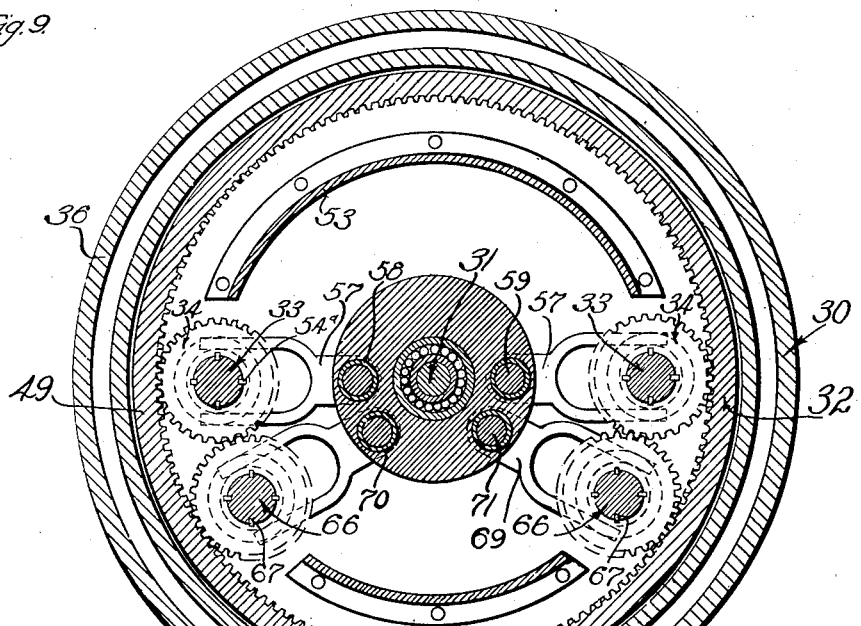
Figure 10:
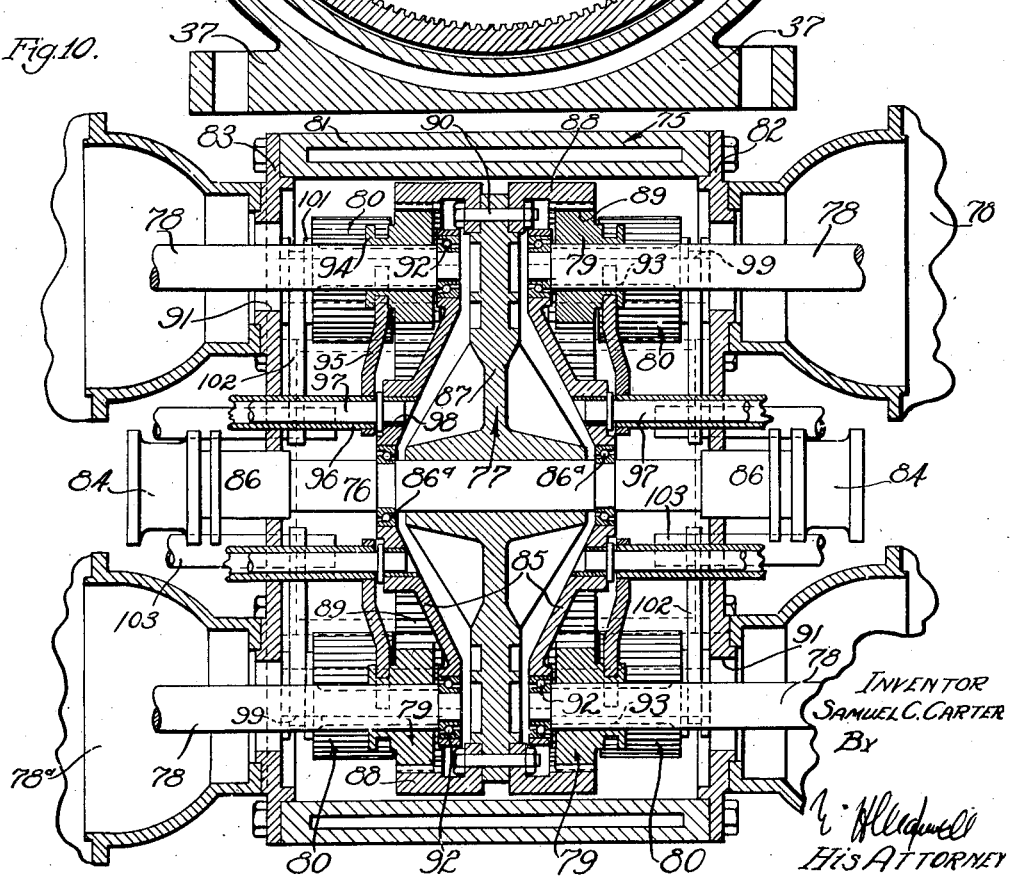

Other objects and features of the invention will be best and more fully understood from the following detailed description of typical forms and applications of the invention, throughout which description reference is had to the accompanying drawings, in which:

Fig. 1 is a plan view of a typical power boat, showing the cabin in plan section. Fig. 2 is a side elevation of the boat. Fig. 3 is a side elevation of the rear or stern portion of the boat, illustrating one manner of mounting the power units and the transmission. Fig. 4 is a diagrammatic plan view, showing one manner of arranging two power units for driving a single driven shaft through the transmission provided by the present invention. Fig. 5 is a diagrammatic side elevation of a typical installation of a power unit and the transmission. Fig. 6 is a plan section view of a portion of a boat, illustrating a typical installation of two power units and the transmission provided by the present invention. Fig. 7 is an enlarged plan or horizontal detailed sectional view of one form of transmission provided by the present invention wherein two drive shafts are employed to drive a driven shaft, illustrating the casings of typical engines attached to the housing. Fig. 8 is an end view of the transmission with the engine casings removed. Fig. 9 is a vertical or transverse detailed sectional view taken substantially as indicated by line 9—9 on Fig. 7, and Fig. 10 is a plan or horizontal detailed sectional view of another form of the invention wherein four drive shafts are employed to drive a single driven shaft.

The transmission mechanisms provided by the present invention are suited for use in various situations where it is desirable to provide a reversible speed reducing drive or transmission between one or more drive shafts and a driven shaft. The invention is particularly adapted to be embodied in forms for marine installations where it may constitute a reversible speed reducing transmission between one or more power units and a propeller shaft. The mechanism is such that it permits the arrangement of the several power units in various manners in a vessel where they may occupy a comparatively small space longitudinally, or forward and aft of the vessel, or a small space transverse or abeam of the ship, or may be placed in staggered relation, or in any other suitable manner.

In the drawings I have illustrated a typical power boat, and have shown various manners of arranging power units and the transmission provided by the present invention in the boat. The present invention is adapted to be employed in connection with various types of power units and in various forms of vessels, as well as in other situations. The invention, therefore, is not to be considered as restricted to the particular embodiments about to be disclosed or to the particular applications illustrated in the drawings.

The boat illustrated in the drawings includes, generally, a hull 10, a cabin 11 having therein convertible bunks or seats 12, a lavatory 13, and a galley 14; an open forward compartment 15 having several seats 16, a steering wheel 17 and other controls in the compartment 15, a rear or aft deck 18; a propeller shaft 19 carrying a propeller 20, and various other parts common to vessels of this general character.

In Figs. 1 and 2 of the drawings I have illustrated an arrangement wherein two power units 21, in the form of internal combustion engines, are mounted in the aft or rear portion of the vessel under the deck 18 and have shafts 22 extending forward to the transmission A provided by this invention. The propeller shaft 19 extends upwardly and forwardly to the transmission A and may be connected therewith by means of a suitable universal joint 23. It will be apparent how the two power units 21 may be readily arranged side by side in the rear or aft portion of the vessel to have their shafts 22 extend into the transmission A for driving the propeller shaft 19. In Fig. 3 of the drawings a power unit 24 is arranged amidships in the hull 10 and has a shaft extending into a transmission B. It will be apparent that two or more power units 24 may be spaced apart abeam of the boat to drive into the transmission B. The propeller shaft 19 may be connected to the driven shaft of the transmission B by a suitable universal joint, or the like.

In Fig. 4 of the drawings two spaced power units 25 are shown arranged so that their shafts 26 converge toward the transmission C and are connected to the high-speed shafts of the transmission by suitable universal joints 27. The propeller shaft 19 extends downward and rearward or aft from the transmission C. Fig. 5 is a diagrammatic side elevation of an arrangement similar to that illustrated in Fig. 4 of the drawings showing the power unit 25$^a$ arranged above the center line of the transmission C$^1$ and illustrating the propeller shaft 19 extending downwardly and rearwardly below the power unit. Fig. 6 is a plan elevation of the amidships portion of a vessel, illustrating the two power units 28 arranged in staggered relation and the transmission D provided by the present invention spaced forwardly of the staggered power units 28. The driven shaft or propeller shaft 19 extends rearwardly between and below the power units 28 toward the aft part of the ship. It will be apparent from the above description of typical installations of power means and transmissions that the transmission is particularly well suited for use in connection with the propulsion means of a vessel.

Figs. 7 to 9 of the drawings illustrate an embodiment of the invention wherein two synchronously rotating drive shafts are employed to drive or operate a single driven shaft, while in Fig. 10 of the drawings I have illustrated a form of the invention in which four drive shafts are employed to drive a single driven shaft.

The form or embodiment of the invention illustrated in Figs. 7 to 9 inclusive of the drawings includes, generally, a housing or casing 30, a low speed or driven shaft 31 extending into the casing 30, a gear 32 on the low speed shaft 31, two spaced drive or high speed shafts 33 extending into the casing 30, a pinion 34 on each of the high speed shafts 33 shiftable into and out of engagement with the gear 32, and reversing pinions 35 shiftable between positions free of the gear 32 and positions in mesh with the gear where they may be driven or operated by the pinions 34 to reverse the drive.

In accordance with the broader principles of the invention, the housing or casing 30 may be of any suitable construction. In the particular case illustrated, the casing 30 includes a main tubular jacketed section 36 provided at its lower side with outwardly projecting mounting flanges 37. End plates 38 and 39 close the opposite ends of the main tubular section 36. The plates 38 and 39 may be secured to the section 36 by suitable bolts or screws 40.

The driven or low speed shaft 31 is adapted to be operatively connected with the propeller shaft 19 of the boat or with any other driven element. The shaft 31 may extend centrally through the casing 30 and may be rotatably supported by a suitable bearing 41 carried by the end plate 38 and a bearing 42 carried by the end plate 39. Sections of flange connections may be provided at the opposite ends of the shaft 31. In the particular case illustrated, a combination of a brake drum 43 and a connecting flange 44 is provided at one end of the shaft 31, and a suitable flange connection 45 is provided at the opposite projecting end of the shaft. It will be apparent that either end of the shaft 31 may be directly connected with a propeller shaft, or may be connected with a propeller shaft by a suitable universal joint, or the like. A brake shoe 46 may be mounted on the drum 43.

The gear 32 is mounted on the low speed shaft 31 within the housing 30. In the preferred form of the invention, the gear 32 is in the nature of a ring gear or internal gear. In the case illustrated, the gear 32 is mounted on the shaft 31 adjacent the end plate 38 and is connected with the shaft by a suitable key or spline connection 47. The gear 32 includes a main circular section 48 and a ring or flange 49 attached to the inner side of the section 48 and projecting inwardly. The flange 49 carries a toothed ring or ring gear 50 for co-operating with the pinions 34 and 35.

The drive or high speed shafts 33 are spaced apart and enter the casing 30 in parallelism. The shafts 33 may be spaced apart in various manners. For example, they may be spaced at opposite sides of the central longitudinal axis of the low speed shaft 31. In the particular case illustrated, the shafts 33 are spaced apart horizontally and enter the housing 30 through openings 51 in the end plate 39 and are parallel to the shaft 31. The inner ends of the shafts 33 may be supported within the casing 30 by a suitable web or mounting 52. The mounting 52 may be substantially circular in form and is arranged within the ring 49. The mounting 52 may be connected with and supported on the end plate 39 of the housing by flanges 53. The flanges 53 may be curved concentric with the axis of the mechanism and may be attached to the end plate 39 by bolts 53$^a$. The inner ends of the shafts 33 may be rotatably supported by bearings 54 carried in openings in the web or mounting 52. The outer projecting ends of the shafts 33 may be connected with two power units operating in synchronism. For example, the shafts 33 may be connected with two internal combustion engines made to operate in synchronism by controlling their operation in accordance with readings of vacuum gauges 150 connected in their intake manifolds. The transmission may be considered as being directly connected with the power units or engines and the shafts 33 may be taken as the shafts extending from the clutch mechanisms of the engines.

In Fig. 7 I have shown portions 33$^a$ of the clutch housings of typical engines connected to the housing 30. It will be apparent that the shafts 33 may be connected with the shafts of the power unit by suitable universal joints in the manners similar to those shown in Figs. 2 to 6, or in other manner as found desirable.

A drive pinion 34 is provided on each of the high speed shafts 33 within the casing 30. The pinions 34 are provided to mesh with or engage the teeth 50 of the gear 32 and are mounted on the shafts 33 to be shiftable into and out of engagement with the low speed gear. In the preferred form of the invention the pinions 34 are connected with the shafts 33 to rotate therewith and to slide thereon by suitable spline connections 54$^a$. The shafts 33 and the pinions 34 are positioned and related to the gear 32 so that the pinions 34 may be slid longitudinally on the shafts 33 into engagement with the teeth 50. The pinions 34 may be related to the gear 32 to provide for the desired ratio of speed reduction between the shafts 33 and the shaft 31.

The invention provides means for independently operating or shifting the pinions 34 into and out of mesh with the gear 32. A hub 55 is provided on the inner end of each pinion 34. A groove 56 is formed in each hub 55 and carries a shifting fork 57. The shifting forks 57 extend inwardly toward the center of the housing and are attached to spaced parallel sleeves 58. The sleeves 58 are slidably carried on stub shafts 59. The shafts 59 have their inner end portions carried in openings 60 in the mounting 52, and the shafts and sleeves extend outwardly through openings 61 in the end plate 39. The slidable sleeves 58 may be connected with any suitable means for operating them longitudinally on the stub shafts to shift the pinions 34 into and out of driving engagement with the gear 32. The sleeves 58 are preferably operable independently so that either one or both of the shafts 33 may be employed to drive the shaft 31 as desired.

In the drawings I have shown the sleeves 58 projecting outwardly from the end plate 39 where they may be operated in any desired manner.

The reversing pinions 35 are provided to reverse the drive between the pinions 34 and the gear 32. The reversing pinions 35 are carried on stub shafts 66 arranged parallel to and spaced from the shafts 33. The stub shafts 66 may have their opposite end portions rotatably supported by suitable bearings carried by the mounting 52 and the end plate 39. The pinions 35 are mounted on the shafts 66 for longitudinal movement. The pinions 35 may be connected with the shafts 66 by suitable splines 67. The pinions 35 are operable between positions free of the teeth 50 of the gear 32 and positions in mesh with the teeth 50. In accordance with the invention, the pinions 35 are made sufficiently wide so that the drive pinions 34 may be in driving engagement with them when they are in mesh with the teeth 50 of the low speed gear 32.

Means is provided for shifting the reversing pinions 35 into and out of operating positions. The means for shifting the pinions 35 may be similar to the means for operating the drive pinions 34 and may include hubs 68 on the outer ends of the pinions and forks 69 carried on the hubs. The forks 69 may be attached to sleeves 70 slidable on stub shafts 71. The sleeves 70 project outwardly through openings in the end plate 39, and may be operated or shifted in any suitable manner. It will be apparent how the sleeves 70 may be operated independently by suitable shifting mechanisms.

It is believed that the utility and operation of the form of the invention illustrated in Figs. 7, 8, and 9 of the drawings will be readily apparent from the foregoing detailed description.

It is to be understood that the high speed shafts 33 may be rotated in synchronism by any suitable power means and that they may be spaced apart in various manners. During operation, when it is desired to provide a forward drive, either one or both of the pinions 34 are shifted into engagement with the teeth 50 of the driven gear 32. The pinions 34 may be related to the driven gear 32 to provide for the desired reduction in speed between the shafts 33 and the shaft 31. When it is desired to reverse the drive, the power units may be stopped or the shafts 33 may be disconnected from the sources of power by clutch mechanisms interposed between them and the source of power and the shaft 31 may be permitted to stop rotation. The pinions 34 may then be shifted out of mesh with the teeth 50 and the pinions 35 shifted into mesh with the teeth 50. It is to be noted that, when the pinions 34 are shifted out of meshing engagement with the teeth 50, they are in position to mesh with the reversing pinions 35. The same ratio reduction in speed is provided in the reverse direction as in the forward drive. The present invention provides a transmission mechanism whereby a reversible and reduction drive is provided between a drive shaft and a driven shaft by means of only three gears and in which any desired number of drive shafts may be connected with the driven shaft by the addition of a drive pinion and a reversing pinion for each added shaft. The element to be driven, such as a propeller shaft, or the like, may be connected with either end of the driven shaft 31 so that the power units operating the shafts 33 may be positioned as desired relative to the propeller shaft.

The form of the invention illustrated in Fig. 10 of the drawings is in the nature of a reversible speed reducing transmission involving four drive or high speed shafts for driving a single driven or low speed shaft. This form of the invention includes, generally, a casing or housing 75, a driven or low speed shaft 76 extending through the housing and carrying a gear 77, four high speed or drive shafts 78 extending into the housing 75, pinions 79 on the high speed shaft for engaging the gear 77, and intermediate or reversing pinions 80 adapted to be brought into engagement with the gear 77 and adapted to be driven by the pinions 79 to reverse the drive.

The housing 75 may be similar, generally, to the housing in the form of the invention described above and may include a main tubular jacketed section 81 and end plates 82 and 83 closing its opposite ends.

The driven or low speed shaft may extend centrally through the housing 75 and may have its opposite ends projecting from the plates 82 and 83. Suitable flanged connecting members 84 may be provided at opposite ends of the shaft 76 so that it may be readily connected with the part to be driven. The shaft 76 may be rotatably supported in openings in the end plates 82 and 83 by suitable bearings 86. Spaced webs or mountings 85 may be provided within the housing 75, and bearings 86ª arranged in openings in the mounting may rotatably support the central part of the shaft 76.

The driven gear 77 is mounted or fixed on the shaft 76 between the mountings 85 and, in accordance with the invention, is in the nature of an internal or ring gear. The gear 77 includes a main circular section 87 and flanges or rings 88 attached to the opposite sides of the section 87 at its periphery. The rings 88 project radially in opposite directions from the central section of the gear and are provided on their inner sides with gear teeth 89. The two rings 88 may be secured or attached to the section 87 by suitable bolts 90. The internal diameters of the two rings 88 are alike, and the same number of gear teeth 89 is provided on each ring. The assembly of the section 87 and the rings 88, constituting the gear 77, is in the nature of a single revolvable element in the housing 75 and adapted to be driven by the several pinions 79.

The drive or high speed shafts 78 extend into the housing or casing 75 parallel to the shaft 76. It may be assumed that the transmission is directly connected with the four power units and that the shafts 78 are the shafts of the units or extend from the clutch mechanisms of the engines. I have shown portions 78ª of the clutch housings of typical engines attached to the housing 75. In the form of the invention illustrated in the drawings, two shafts 78 extend through openings 91 in each of the plates 82 and 83 to project into the casing 75. The shafts 78 at the opposite ends of the casing 75 may be spaced apart horizontally and at opposite sides of the central low speed shaft 76.

In the particular case illustrated, the shafts at the opposite sides of the casing are in longitudinal alignment. The shafts 78 are intended to be rotated in synchronism and may be driven in any suitable manner. As the shafts 78 enter opposite sides of the transmission and in spaced relation, the power units for driving them may be effectively arranged in various manners. The inner end parts of the shafts 78 may be rotatably supported by bearings 92 carried by the mountings 85.

A driving pinion 79 is mounted on each drive or high speed shaft 78 and is operable into and out of meshing engagement with the gear 77. The pinions 79 are slidably mounted on the shafts 78 within the casing 75. In accordance with the invention, the shafts 78 are of equal effective diameter and are positioned and proportioned so that they may be readily brought into engagement with the teeth 89. The pinions 79 are mounted on the shafts 78 for longitudinal movement and are held against rotation thereon by suitable spline or key connections 93.

The invention provides means for sliding the pinions 79 along the shafts 78 to bring them into and out of engagement with the gear 77. In accordance with the broad principles of the invention, the pinions 79 may be shifted or operated in any suitable manner. In the form of the invention illustrated in the drawings, the pinions 79 are provided on their outer ends with grooved hubs 94. Forks 95 are carried by the hubs 94 and project inwardly toward the center of the casing 75. The forks 95 are attached to sleeves 96 slidable on stub shafts 97. The stub shafts 97 have their inner end parts carried in openings 98 in the mountings 85, and the shafts and sleeves 96 extend outwardly through openings in the plates 82 and 83 to project from the housing. The projecting portions of the sleeves 96 may be connected with suitable operating means whereby the several pinions 79 may be shifted independently.

The intermediate or reverse pinions 80 are adapted to be brought into mesh with the teeth 89 of the gear 77 and to be driven by the pinions 79 to reverse the drive. There is a reversing pinion 80 arranged adjacent each drive pinion 78 in a position where it may be brought into engagement with the teeth 89 and may be engaged by the pinion 79. The reversing pinions 80 are slidably carried on stub shafts 99. The shafts 99 may have their inner end portions carried in openings (not shown) in the mountings 85. The shafts 99 project outwardly from the mountings and extend through openings in the plates 82 and 83 to project from the opposite ends of the casing 75. Hubs 101 may be provided on the outer ends of the reversing pinions 80, and forks 102 may be carried by the hubs. The forks 102 project inwardly and are attached to slidable sleeves 103. The sleeves 103 project outwardly through the end plates 82 and 83. Suitable means may be provided at the exterior of the transmission for sliding the sleeves 103 independently of one another so that any one or all of the four reversing pinions 80 may be shifted between positions in mesh with the gear 77 and positions free of the gear 77.

In the form of the invention illustrated in Fig. 10 of the drawings, any one of the four drive shafts 78, or all of the drive shafts 78, may be employed to operate the driven shaft 76. The shafts 78 may be independently connected with the driven shaft 76 by the independent shifting of the sleeves 96. It is to be noted that the invention provides a transmission wherein a maximum amount of power may be passed through a single transmission mechanism. The power units for driving the shafts 78 may be positioned at opposite ends of the transmission and at different elevations, etc., as the shafts 78 may enter the casing at any points necessary. It will be apparent that the invention may be embodied in forms for providing a reversible reduction drive between any reasonable number of drive shafts and a single given drive shaft.

Having described only typical preferred forms of my invention, I do not wish to limit myself to the specific details set forth, but wish to reserve to myself any changes or variations that may appear to those skilled in the art or fall within the scope of the following claims.

Having described my invention, I claim:

1. In combination, two power units adapted to operate in synchronism, a low speed shaft, a high speed shaft driven by each power unit, and a transmission including a gear on the low speed shaft, a pinion on each of the high speed shafts, and means for shifting the pinions into and out of engagement with the gear.

2. A transmission including, a plurality of high speed shafts, a single low speed shaft, a gear on the low speed shaft, a pinion slidable on and rotatable with each high speed shaft, means for shifting the pinions into and out of engagement with the gear, and intermediate pinions operable to form drives between the pinions and the gear.

3. A transmission including, a plurality of high speed shafts, a single low speed shaft, a gear on the low speed shaft, pinions on each of the high speed shafts, separate means for shifting each of the pinions into and out of engagement with the gear, and reversing pinions, separate means for shifting each of the pinions to positions to form drives between the pinions and the gear when the pinions are out of engagement with the gear.

4. A transmission including, a housing, a single low speed shaft extending into the housing, a plurality of high speed shafts extending into the housing, a gear on the low speed shaft within the housing, a pinion on each of the high speed shafts within the housing, means whereby the pinions may be operated into and out of mesh with the gear, and a reversing pinion for each pinion adapted to mesh with the gear and its pinion when the said pinion is out of mesh with the gear.

5. A transmission including, a housing, a single low speed shaft extending into the housing, a plurality of high speed shafts extending into the housing, a gear on the low speed shaft within the housing, a pinion on each of the high speed shafts within the housing, means for independently shifting each pinion into and out of mesh with the gear, and reversing pinions operable to mesh with the gear and the pinions when the pinions are out of mesh with the gear.

6. A transmission including, a housing, a single low speed shaft extending into the housing, a plurality of high speed shafts extending into the housing, a gear on the low speed shaft within the housing, a pinion on each of the high speed shafts within the housing, means for shifting the pinions into and out of engagement with the gear, shiftable reversing pinions in the housing, and means for shifting the reversing pinions into engagement with the gear and the pinions when the pinions are out of engagement with the gear.

7. In combination, a plurality of synchronously operating power units, drive shafts rotated by the power units, a single driven shaft, a gear on the driven shaft, a pinion rotatable with and slidable on each drive shaft, and means for independently shifting the pinions into and out of engagement with the gear.

8. In combination, a plurality of synchronously rotating drive shafts, a single driven shaft, a gear on the driven shaft, a pinion rotatable with and slidable on each drive shaft, means for sliding the pinions on the drive shafts into and out of engagement with the gear, a shiftable reversing pinion adjacent each pinion, and means for shifting the reversing pinions into and out of positions where they engage the gear and the pinions when the pinions are out of engagement with the gear.

9. In combination, a plurality of power units operating in synchronism, and a transmission including, a housing, a low speed shaft extending into the housing, high speed shafts driven by the power units and extending into opposite ends of the housing, a revolvable element on the low speed shaft within the housing, a pinion slidable on and rotatable with each high speed shaft, and means for shifting the pinions into and out of engagement with the element.

10. In combination, spaced power units adapted to operate in synchronism, and a transmission including, a housing between the power units, a low speed shaft extending into the housing and projecting from opposite ends thereof, high speed shafts driven by the power units and extending into opposite ends of the housing, a revolvable element on the low speed shaft within the housing, a pinion slidable on and rotatable with each high speed shaft, and means for shifting the pinions into and out of engagement with the element.

11. In combination, transmission including, a housing, a low speed shaft extending into the housing, a revolvable element on the low speed shaft within the housing, two spaced high speed shafts extending into each of two opposite ends of the housing, and a pinion on each of the high speed shafts shiftable into and out of driving engagement with the element, and two power units at each of said opposite ends of the housing driving said high speed shafts, the power units being adapted to operate in synchronism.

12. A transmission including, a housing, a low speed shaft extending into the housing, a revolvable element on the low speed shaft within the housing, two spaced high speed shafts extending into each of two opposite ends of the housing, a pinion on each of the high speed shafts shiftable into and out of driving engagement with the said element, means for shifting the pinions, and reversing pinions for forming drives between the element and the pinions when the pinions are out of engagement with the said element.

13. A transmission including, a housing, a low speed shaft extending into the housing, an internal gear on the low speed shaft within the housing, spaced high speed shafts extending into the housing, pinions slidable on and rotatable with the high speed shaft, means for individually shifting the pinions into and out of engagement with the internal gear, reversing pinions shiftably mounted in the housing, and means for shifting the reversing pinions into engagement with the internal gear and the pinions when the pinions are out of engagement with the internal gear.

14. A transmission including, a housing, a low speed shaft extending into the housing, an internal gear on the low speed shaft within the housing, spaced high speed shafts extending into the housing, pinions slidable on and rotatable with the high speed shaft, means for individually shifting the pinions into and out of engagement with the internal gear, and means for supporting the inner end portions of the high speed shafts on the housing at points within the internal gear.

15. A transmission including, a housing, a low speed shaft extending into the housing, an internal gear on the low speed shaft within the housing, spaced high speed shafts extending into the housing, pinions slidable on and rotatable with the high speed shaft, means for individually shifting the pinions into and out of engagement with the internal gear, stub shafts in the housing, means supporting the stub shafts within the internal gear, reversing pinions slidable on the stub shafts, and means for shifting and reversing pinions into engagement with the internal gear and the pinions when the pinions are out of engagement with the internal gear.

13. A transmission including, a housing, a low speed shaft extending into the housing, an internal gear on the low speed shaft within the housing, spaced high speed shafts extending into the housing, pinions slidable on and rotatable with the high speed shaft, means for individually shifting the pinions into and out of engagement with the internal gear, a mounting within the internal gear rotatably supporting the end portions of the high speed shafts.

17. In a transmission, the combination of a housing, a low speed shaft extending into the housing and projecting from opposite ends thereof, spaced high speed shafts extending into said opposite ends of the housing, means in the housing for forming a speed reducing forward drive between the several high speed shafts and the low speed shaft, and means within the housing for forming a reverse drive between the high speed shafts and the low speed shaft.

In witness that I claim the foregoing, I have hereunto subscribed my name this 2nd day of January, 1931.

SAMUEL C. CARTER.